T. H. THOMAS.
BRAKE VALVE DEVICE.
APPLICATION FILED SEPT. 12, 1919.
1,355,188.
Patented Oct. 12, 1920.
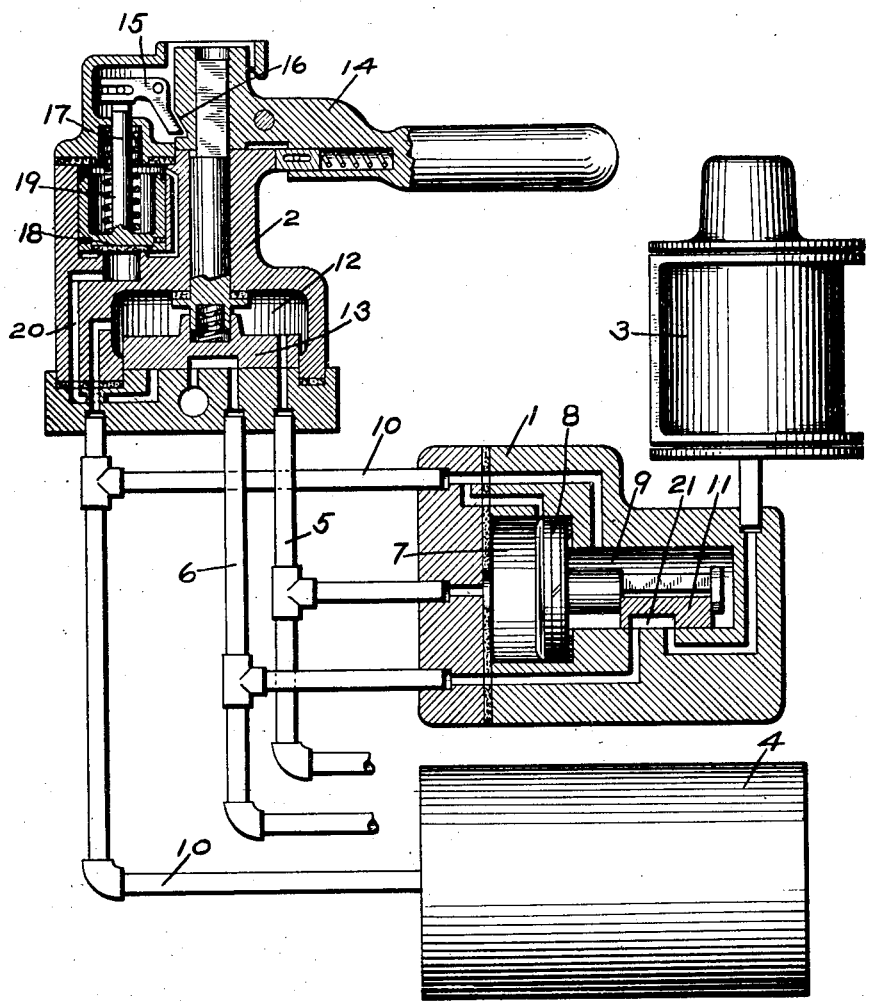
INVENTOR
Thomas H. Thomas
BY
Wm. H. Cady
ATTORNEY

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-VALVE DEVICE.

1,355,188.     Specification of Letters Patent.     Patented Oct. 12, 1920.

Application filed September 12, 1919. Serial No. 323,272.

*To all whom it may concern:*

Be it known that I, THOMAS H. THOMAS, a citizen of the United States, residing at Edgewood, in the county of Allegheny and State of Pennsylvania, have invented new and useful Improvements in Brake-Valve Devices, of which the following is a specification.

This invention relates to fluid pressure brakes, and more particularly to a brake valve device.

When the motorman operating a car removes the brake valve handle and leaves the operating end of the car for any purpose, such as in going from one end of the car to the other, the brakes should be applied for safety, so as to eliminate any possibility of the car running away.

In order to insure that the brakes will be applied when the brake valve handle is removed, the principal object of my invention is to provide a brake valve device having means for preventing the removal of the brake valve handle unless a straight air application of the brakes has been made.

In the accompanying drawing, the single figure is a diagrammatic view of a car fluid pressure brake equipment, with my improvement applied thereto.

As shown in the drawing, the equipment may comprise a straight air emergency valve device 1, a brake valve device 2, a brake cylinder 3, a reservoir 4, an emergency brake pipe 5, and a straight air pipe 6.

The straight air emergency valve device 1 may comprise a casing having a piston chamber 7, connected to brake pipe 5 and containing a piston 8 and a valve chamber 9 connected to the reservoir pipe 10 and containing a slide valve 11 adapted to be operated by piston 8.

The brake valve device 2 may comprise a casing having a rotary valve chamber 12, containing a rotary valve 13 adapted to be operated by a removable handle 14.

According to my invention, a locking latch 15 is provided which is adapted to normally engage within a notch 16 cut in the body of the brake valve handle 14.

The latch 15 is pivotally mounted and is operatively connected to a stem 17 connected to a piston 18. The piston 18 is subject on one side to the pressure of a coil spring 19, tending to hold the latch in its locked position with respect to the brake valve handle, and the opposite side of the piston is connected to a port 20, leading to the seat of the rotary valve 13.

In operation, the brake valve may be manipulated in the usual manner for controlling the application and release of the brakes and if the motorman desires to remove the handle, he must first move the brake valve handle to straight air application position, in which fluid is supplied through ports in the rotary valve 13 to straight air pipe 6, and thence through cavity 21 in slide valve 11 to brake cylinder 3.

In the straight air application position of the rotary valve 11, the port 20 is connected, by a port in the rotary valve 11, to rotary valve chamber 12, so that fluid under pressure is supplied to piston 18 and said piston is thereupon operated to move the latch 15 out of engagement with the notch 16 in the brake valve handle 14.

The handle may then be removed by turning the same to the usual handle off position.

It will be noted that by pivotally mounting the latch 15 and providing the same with an inclined face, the handle may be applied, even if the latch happens to be in its locked position, as would be the case, for example, when the car is being taken out of the barn and the brakes have not been applied.

The movement of the handle in applying the same will push the latch out of the way by engaging the inclined face, so that the latch will not interfere with applying the handle.

Having now described my invention, what I claim as new, and desire to secure by Letters Patent, is:—

1. The combination with a brake valve device having a removable handle, of means for normally locking the handle against removal and operated upon effecting a straight air application of the brakes for releasing the handle to permit the removal of same.

2. The combination with a brake valve device having a removable handle, of a latch for normally locking the handle against removal and a piston operated by fluid under pressure supplied thereto upon effecting a straight air application of the brakes for releasing said latch to permit the removal of the handle.

3. The combination with a brake valve device having a removable handle, of a latch for normally locking the handle against removal, a spring tending to hold the latch locked, and a piston operated by fluid under pressure supplied upon effecting a straight air application of the brakes for releasing said latch.

4. The combination with a brake valve device having a removable handle, of a pivotally mounted latch for locking the handle against removal and adapted to be pushed aside by the handle to permit application of the handle when the latch is in its locked position.

In testimony whereof I have hereunto set my hand.

THOMAS H. THOMAS.